(12) United States Patent
Lu et al.

(10) Patent No.: US 9,895,949 B2
(45) Date of Patent: Feb. 20, 2018

(54) RETRACTABLE SUSPENSION SYSTEM

(71) Applicant: Ship and Ocean Industries R&D Center, New Taipei (TW)

(72) Inventors: Ting-Yu Lu, New Taipei (TW);
Chai-Min Chiang, New Taipei (TW);
Ming-Jung Chen, New Taipei (TW);
Chen-Chou Lin, Taipei (TW);
Jyh-Jone Lee, Taipei (TW)

(73) Assignee: SHIP AND OCEAN INDUSTRIES R&D CENTER, New Taipei (TW)

( * ) Notice: Subject to any disclaimer, the term of this patent is extended or adjusted under 35 U.S.C. 154(b) by 42 days.

(21) Appl. No.: 14/983,488

(22) Filed: Dec. 29, 2015

(65) Prior Publication Data

US 2017/0158014 A1    Jun. 8, 2017

(30) Foreign Application Priority Data

Dec. 4, 2015    (TW) .............................. 104140708 A

(51) Int. Cl.
| | |
|---|---|
| *B60G 17/00* | (2006.01) |
| *B60F 3/00* | (2006.01) |
| *B60G 7/00* | (2006.01) |
| *B60G 3/20* | (2006.01) |
| *B60G 17/0165* | (2006.01) |

(52) U.S. Cl.
CPC .............. *B60G 17/00* (2013.01); *B60F 3/003* (2013.01); *B60G 3/20* (2013.01); *B60G 7/00* (2013.01); *B60G 17/0165* (2013.01); *B60F 3/0069* (2013.01); *B60G 2200/144* (2013.01); *B60G 2204/421* (2013.01); *B60G 2300/28* (2013.01)

(58) Field of Classification Search
CPC .......... B60G 17/00; B60G 7/006; B60G 7/00; B60G 17/0161; B60G 15/063; B62D 7/148; B62D 7/006
See application file for complete search history.

(56) References Cited

U.S. PATENT DOCUMENTS

| | | | |
|---|---|---|---|
| 4,958,584 A | 9/1990 | Williamson | |
| 5,855,344 A * | 1/1999 | Rogers | F16M 11/04 |
| | | | 248/123.2 |
| 6,505,694 B2 | 1/2003 | Maguire | |
| 7,922,181 B2 * | 4/2011 | Hakui | B60G 15/063 |
| | | | 267/175 |
| 8,068,955 B2 * | 11/2011 | Yanagi | B62D 7/148 |
| | | | 280/86.758 |
| 8,755,972 B2 * | 6/2014 | Aoki | B60G 7/006 |
| | | | 280/86.75 |
| 2008/0203690 A1 * | 8/2008 | Horiuchi | B60G 7/006 |
| | | | 280/86.75 |

(Continued)

FOREIGN PATENT DOCUMENTS

| | | |
|---|---|---|
| CN | 1251895 C | 4/2006 |
| DE | 112004001384 T5 | 11/2006 |

*Primary Examiner* — Hau V Phan
(74) *Attorney, Agent, or Firm* — Cheng-Ju Chiang

(57) ABSTRACT

A retractable suspension system for use with an amphibious vehicle is provided and includes three rotation points disposed on the vehicle body of the vehicle, three integration points disposed on an integration element of a tire, an actuating device and a damping component, so as to render the retractable suspension system structurally simple and multifunctional.

12 Claims, 5 Drawing Sheets

(56) References Cited

U.S. PATENT DOCUMENTS

2009/0177348 A1* 7/2009 Yanagi .................. B62D 7/148
  701/31.7
2010/0164189 A1* 7/2010 Buma ................ B60G 17/0161
  280/5.521

* cited by examiner

RETRACTABLE SUSPENSION SYSTEM

CROSS-REFERENCE TO RELATED APPLICATION AND CLAIM OF PRIORITY

This application claims the benefit of Taiwanese Patent Application No. 104140708, filed on Dec. 4, 2015, in the Taiwan Intellectual Property Office, the disclosure of which is incorporated herein in its entirety by reference.

TECHNICAL FIELD

The present invention relates to retractable suspension systems and more particularly to a retractable suspension system which is applicable to amphibious vehicles and has at least one first rotation point, at least one second rotation point, at least one third rotation point and an integration element.

DESCRIPTION OF THE RELATED ART

Modern amphibious vehicles, which have been around for decades, function as automobiles and ships to thereby travel on both land and water according to related circumstances and as needed. Amphibious vehicles originate from amphibious warfare but began to serve purposes pertaining to disaster rescue, detection, exploration and sightseeing upon termination of the last large-scale world war.

Sightseeing-oriented large-sized amphibious ships are presently in use. By contrast, disaster rescue-oriented small and medium-sized amphibious ships require a retractable suspension system for reducing their water resistance while traveling on water.

Techniques about the structural design of a conventional retractable suspension system abound. The main purpose of the conventional retractable suspension system is to retract terrestrial tires to above the waterline and thus reduce the water resistance of amphibious vehicles traveling on water. The aforesaid purpose should be achieved without compromising functions, such as damping, transmission, steering and braking, required for the amphibious vehicles to operate as terrestrial vehicles.

The conventional retractable suspension system has disadvantages as follows: its intricate mechanism design adds to weight of vehicles, gasoline consumed by the vehicles, manufacturing costs of the vehicles, and difficulty in overhauls and maintenance of the vehicles; and its intricate structure is unfit for small and medium-sized amphibious vehicles because of the low capacity thereof. Furthermore, disaster rescue-oriented amphibious vehicles must be compact and easy to operate in order to perform rescue operations speedily before the 72-hour golden period expires.

Therefore, there is still room for improvement in weight reduction, structural simplification and time-efficiency performance of the conventional retractable suspension system, especially in the situation where disaster rescue-oriented small and medium-sized amphibious vehicles are involved.

SUMMARY

To solve the problems confronted by the prior art, the present invention provides a retractable suspension system which comprises a body, at least one first rotation point, a damping component, at least one second rotation point, a first actuating mechanism, at least one third rotation point, a second actuating mechanism and an integration element.

The at least one first rotation point, the at least one second rotation point and the at least one third rotation point are disposed on the body sequentially. The damping component is connected to the at least one first rotation point. The first actuating mechanism is rotatably connected to the damping component and the at least one second rotation point. The first actuating mechanism is an A-shaped frame, an actuating device, or a combination thereof.

The second actuating mechanism is connected to the at least one third rotation point. The second actuating mechanism is an A-shaped frame or an actuating device. The integration element is connected to the first actuating mechanism and the second actuating mechanism, thereby forming the retractable suspension system.

DESCRIPTION OF THE PREFERRED EMBODIMENTS

To enable persons skilled in the art to gain insight into the technical features and practical advantages of the present invention and implement the present invention according to the specification, the present invention is hereunder illustrated with preferred embodiments depicted with the accompanying drawings and described below.

Figure 1A:
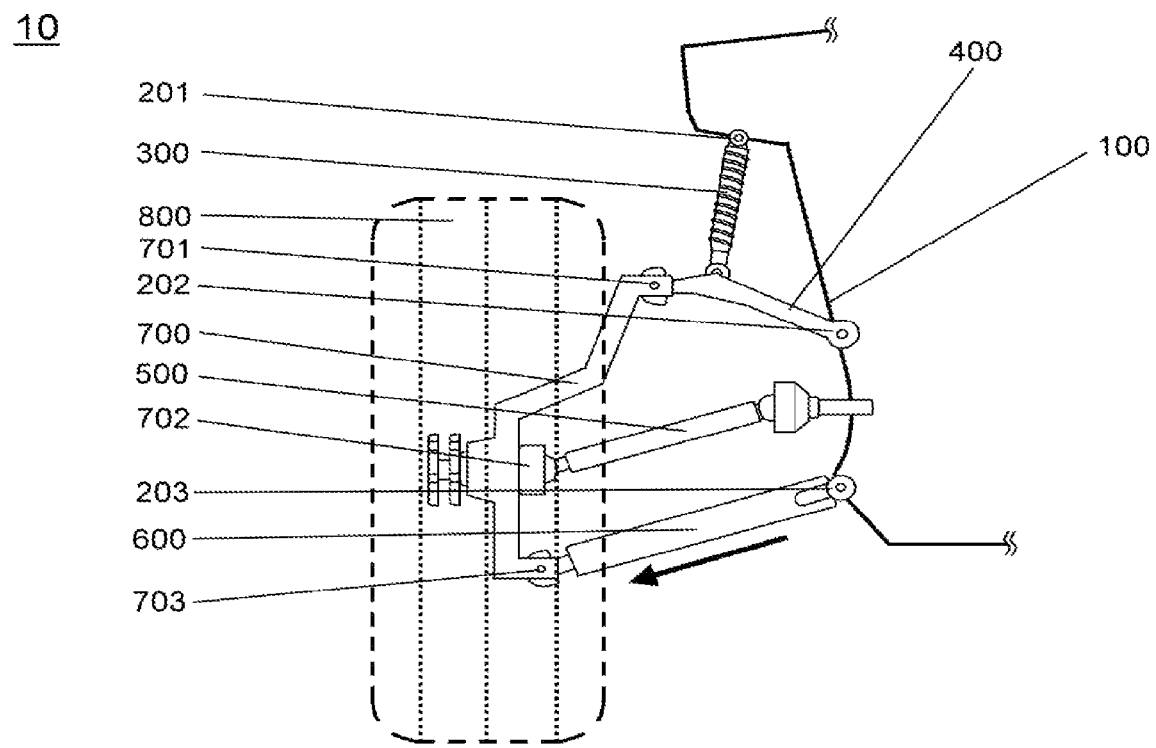
FIG. 1(a) is a schematic view of the structure of a retractable suspension system according to an embodiment of the present invention.

Embodiments of the present invention mainly feature two implementation aspects described below. The first implementation aspect is illustrated with FIG. 1(a) which is a schematic view of the structure of a retractable suspension system according to an embodiment of the present invention. Referring to FIG. 1(a), the retractable suspension system 10 of the present invention comprises a body 100, at least one first rotation point 201, a damping component 300, at least one second rotation point 202, a first actuating mechanism, at least one third rotation point 203, a second actuating mechanism and an integration element 700. In this embodiment, the first actuating mechanism and the second actuating mechanism are implemented in the forms of rod elements. A first actuating mechanism rod element 400 and a second actuating mechanism rod element 600 are described below, illustrated with an embodiment, and depicted in the accompany drawings.

The body 100 is a chassis of a terrestrial or amphibious vehicle, whereas the at least one first rotation point 201, the at least one second rotation point 202 and the at least one third rotation point 203 are disposed on the body 100 sequentially. In this embodiment, the at least one first rotation point 201, the at least one second rotation point 202 or the at least one third rotation point 203 is a pivot; however, the present invention is not limited thereto, as a ball-and-socket joint, pin, screw, nut, bearing and the like, each of which enables a mechanical moment of force, such as that of an A-shaped frame, to rotate freely by angles within a specific range, should fall into the scope of the present invention.

The damping component 300 is connected to the at least one first rotation point 201. In this embodiment, the damping component 300 is a spring-based damper, an electromagnetic damper, an electric-driven damper, a hydraulic damper, a pneumatic damper or a combination thereof selected as needed and according to the front and rear wheels of or the terrain to be adapted to by an amphibious vehicle, but the present invention is not limited thereto.

The first actuating mechanism rod element 400 is rotatably connected to the damping component 300 and the at least one second rotation point 202. The first actuating mechanism rod element 400 is selectively an A-shaped frame, an actuating device, or a combination of links thereof, and is, in this embodiment, an A-shaped frame (the first actuating mechanism rod element 400) which looks slightly folded when viewed laterally.

The second actuating mechanism rod element 600 is connected to the at least one third rotation point 203. The second actuating mechanism rod element 600 is an A-shaped frame or an actuating device. This embodiment uses an actuating device, and the actuating device (the second actuating mechanism rod element 600) is a linear motor actuator, a hydraulic actuator, a pneumatic actuator, an electric-driven actuator, or an electromagnetic actuator selected as needed and according to the front and rear wheels of or the terrain to be adapted to by an amphibious vehicle, but the present invention is not limited thereto. In this embodiment, the actuating device (the second actuating mechanism rod element 600) is the main source of the driving force under which a tire 800 retracts. The actuating device moves in the direction indicated by the arrow shown in FIG. 1(a) to drive the tire 800 to rotate upward and retract until the tire 800 retracts above the waterline, thereby reducing the water resistance which opposes the advance of the amphibious vehicle.

The wheels of an amphibious vehicle traveling on land function as the main actuating mechanism rod elements whereby the amphibious vehicle advances, and thus a transmission system is indispensable to the amphibious vehicle. In this embodiment, the integration element 700 is connected to the first actuating mechanism rod element 400 and the second actuating mechanism rod element 600. In this embodiment, the integration element 700 is connected to the tire 800, whereas a first integration point 701, a second integration point 702 and a third integration point 703 are disposed on the integration element 700 sequentially in a top-to-bottom order.

The first integration point 701 is connected to the first actuating mechanism rod element 400. The first integration point 701 is disposed outside the space of an inner rim for the tire 800. The second integration point 702 is connected to the tire 800. The third integration point 703 is connected to the second actuating mechanism rod element 600.

The second integration point 702 is not only connected to the tire 800 but also connected to a drive shaft 500, so as to form the structure of connecting the body 100 and the drive shaft 500 as well as connecting the drive shaft 500 and the second integration point 702.

Figure 1B:
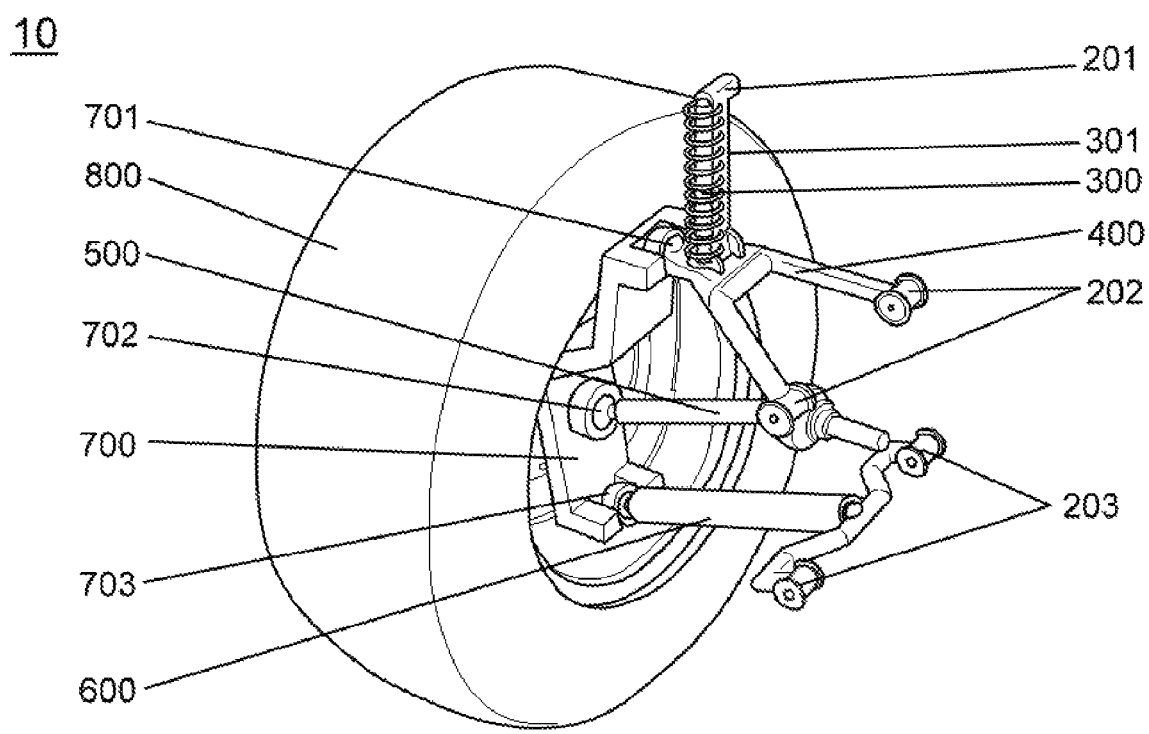
FIG. 1(b) is a perspective view of the retractable suspension system shown in FIG. 1(a)

Referring to FIG. 1(b), which is a perspective view of the retractable suspension system shown in FIG. 1(a), in this embodiment, the first actuating mechanism rod element 400 is the A-shaped frame 402. Hence, in this embodiment, the at least one second rotation point 202 is provided in the number of two, whereas the second actuating mechanism rod element 600 is provided in the form of a single actuating device, and thus the second actuating mechanism rod element 600 has to move synchronously with the first actuating mechanism rod element 400. Hence, to get connected to the body 100, the at least one third rotation point 203 is provided in the form of an equal-arm support, and thus the at least one third rotation point 203 is also provided in the number of two.

Referring to FIG. 1(b), the A-shaped frame (the first actuating mechanism rod element 400) is rotatably connected to the suspension rod 301, and the suspension rod 301 is connected to the damping component 300. The suspension rod 301 is a metallic extendible rod or a damping component of any other type, to ensure that the retractable suspension system 10 operates smoothly in its entirety.

Referring to FIG. 1(b), the integration element 700 is further described below. The first integration point 701 is connected to the first actuating mechanism rod element 400 by a ball-and-socket joint disposed on the first integration point 701 and capable of directional rotation. Likewise, the aforesaid mechanism feature is also found in the second integration point 702 and the third integration point 703. In this embodiment, due to the uniqueness of the transmission system, the body 100 and the second integration point 702 are connected by two directional ball-and-socket joints at two ends of the drive shaft 500 to provide the source of the driving force under which transmission takes place without hindering the retraction.

Figure 2A:
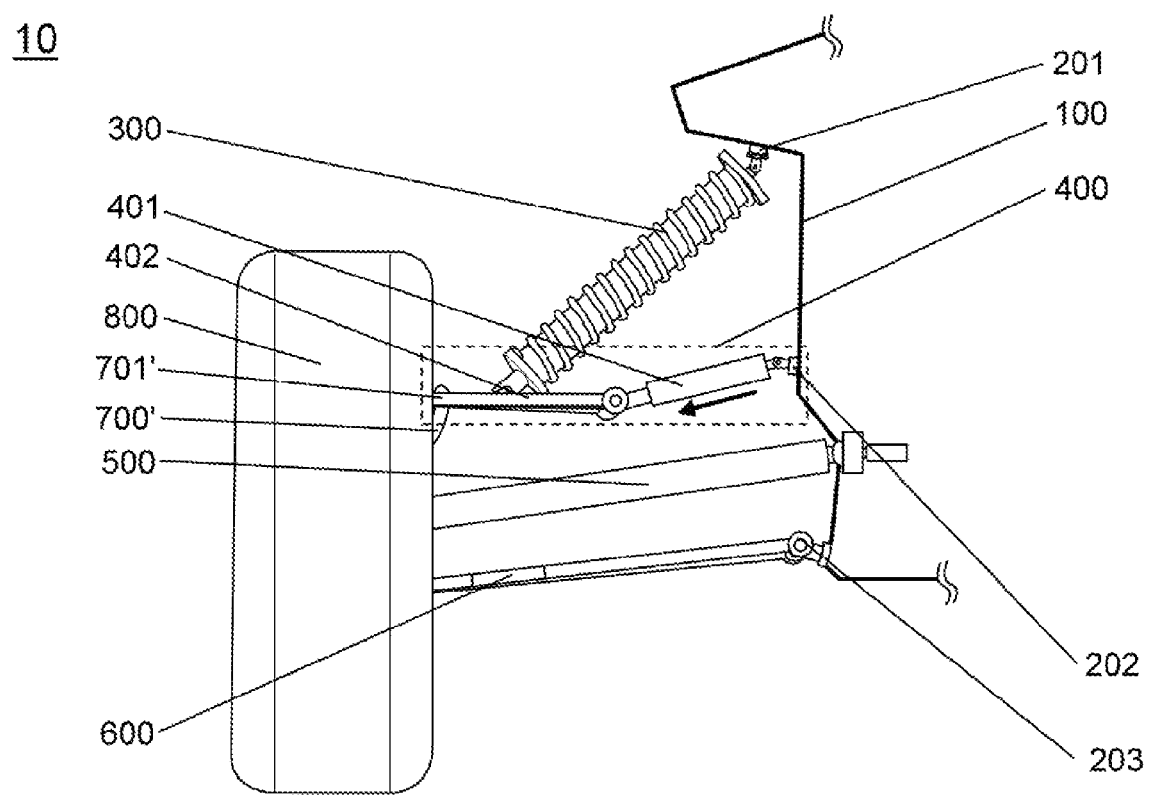
FIG. 2(a) is a schematic view of the structure of the retractable suspension system according to another embodiment of the present invention.
Figure 2B:
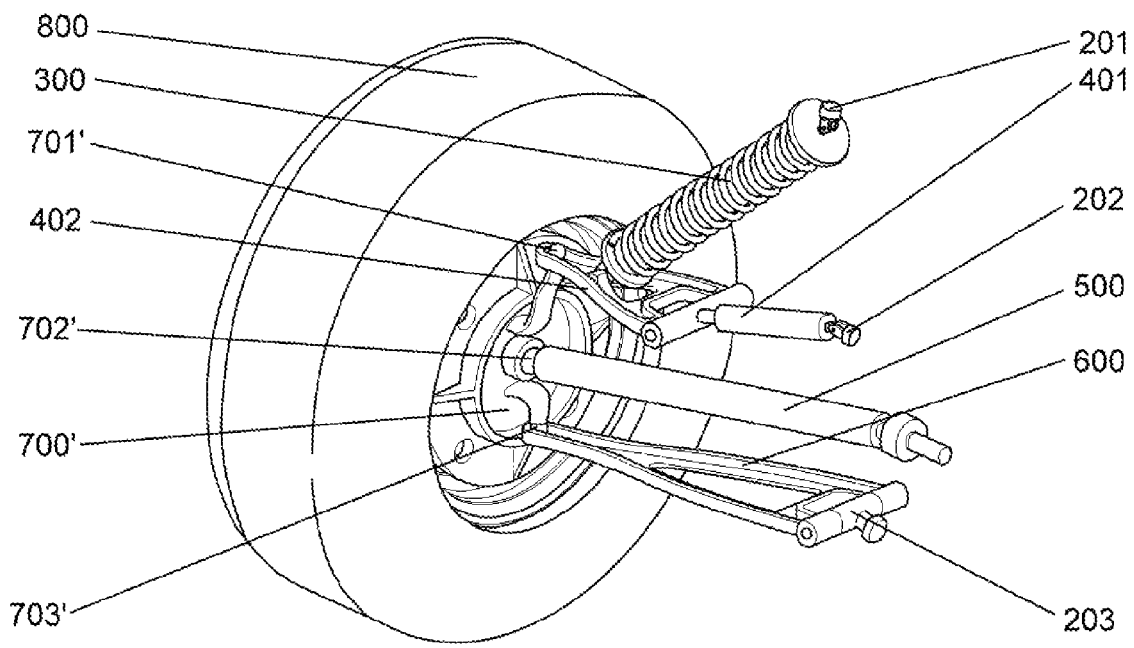
FIG. 2(b) is a perspective view of the retractable suspension system shown in FIG. 2(a)

Referring to FIGS. 2(a) and 2(b), another embodiment of the present invention is described below. FIG. 2(a) is a schematic view of the structure of the retractable suspension system according to another embodiment of the present invention. FIG. 2(b) is a perspective view of the retractable suspension system shown in FIG. 2(a).

The embodiment illustrated with FIG. 2(a) and FIG. 2(b) differs from the preceding embodiment in that the first actuating mechanism rod element 400 consists of a link combination of an actuating device 401 and an A-shaped frame 402, whereas the second actuating mechanism rod element 600 is the A-shaped frame 402. Like the preceding embodiment, the embodiment illustrated with FIG. 2(a) and FIG. 2(b) is further characterized in that: the first actuating mechanism rod element 400 almost equals the second actuating mechanism rod element 600 in arm length; the second rotation point 202 and the third rotation point 203 which connect with the first actuating mechanism rod element 400 and the second actuating mechanism rod element 600 sequentially are equal in number, i.e., one, in this embodiment.

In this embodiment, the arrow shown in FIG. 2(a) indicates the direction in which the retraction motion mechanism moves. To retract, the actuating device 401 in the first actuating mechanism rod element 400 drives the A-shaped frame 402 to move in the direction indicated by the arrow and thus lifts the A-shaped frame 402, because the damping component 300, the first rotation point 201 and the A-shaped frame 402 are rotatably connected to each other, and in consequence the A-shaped frame 402 in the second actuating mechanism rod element 600 and the drive shaft 500 are lifted together with the tire 800.

Referring to FIG. 2(b), an integration element 700' in the embodiment illustrated with FIG. 2(a) and FIG. 2(b) is disk-shaped. Hence, a first integration point 701', a second integration point 702' and a third integration point 703' of the integration element 700' are slightly different in shape from the integration element 700, the first integration point 701, the second integration point 702 and the third integration point 703 which are continuously bent, band-shaped and presented in the embodiment illustrated with FIG. 1(*a*) and FIG. 1(*b*).

Figure 3:
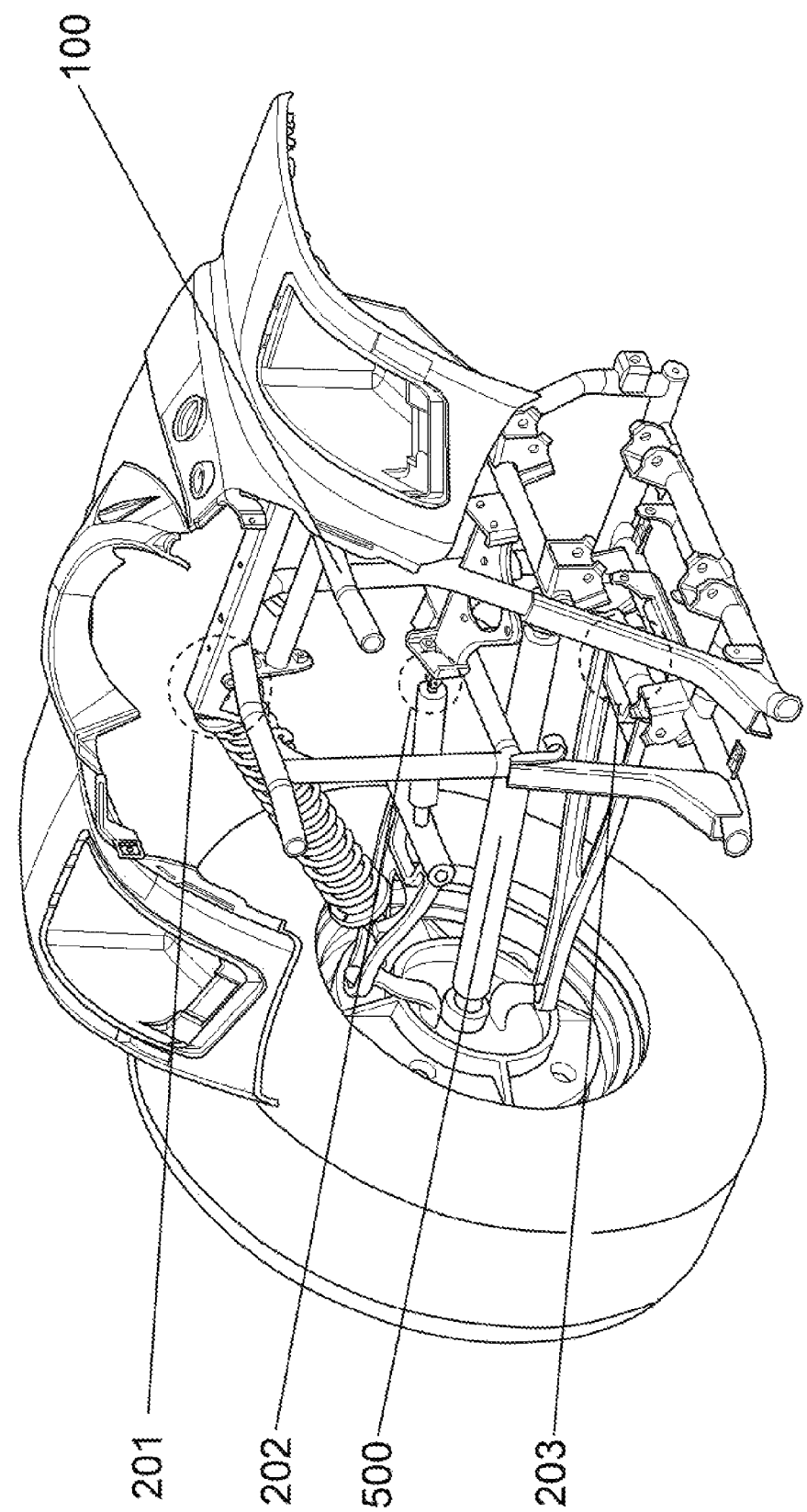
FIG. 3 is a schematic view of the retractable suspension system mounted on a vehicle according to the present invention.

Referring to FIG. 3, there is shown a schematic view of the retractable suspension system mounted on a vehicle according to the present invention. As shown in FIG. 3, a way of implementing the at least one retractable suspension system 10 essentially requires a vehicle, wherein the at least one retractable suspension system 10 is connected to the body 100 of the vehicle.

In general, amphibious vehicles with retractable wheels are equipped with four or six wheels and the tire 800 of a dimension which ranges from 10 to 20 inches. Hence, FIG. 3, which shows part of a vehicle, depicts that the quantity of the at least one retractable suspension system 10 required is subject to changes as needed, but the present invention is not limited thereto. In the embodiment illustrated with FIG. 3, the retractable suspension system 10 comprises the first rotation point 201, the second rotation point 202 and the third rotation point 203 which serve a connection purpose and the position of the drive shaft 500 which transmits a driving force.

The present invention is disclosed above by preferred embodiments. However, the preferred embodiments should not be interpreted as restrictive of the scope of the present invention. Hence, all simple equivalent changes and modifications made to the aforesaid embodiments according to the claims and specification of the present invention should fall within the scope of the present invention.

What is claimed is:

1. A retractable suspension system, comprising:
   a body;
   at least a first rotation point disposed on the body;
   a damping component connected to the at least a first rotation point;
   at least a second rotation point disposed on the body;
   a first actuating mechanism rotatably connected to the damping component and the at least a second rotation point and being a physical connection of an actuating device and an A-shaped frame, the actuating device and the A-shaped frame of the first actuating mechanism are rotatably connected;
   the damping component, the first rotation point and the A-shaped frame of the first actuating mechanism are rotatably connected to each other;
   two third rotation points disposed on the body;
   a second actuating mechanism connected to the two third rotation points and being an actuating device which is connected with an equal-arm support, the equal-arm support is rotatably connected with the two third rotation points; and
   an integration element connected to the A-shaped frame of the first actuating mechanism and the second actuating mechanism.

2. The retractable suspension system of claim 1, wherein the body is a chassis of a terrestrial or amphibious vehicle.

3. The retractable suspension system of claim 1, wherein one of the at least a first rotation point, the at least a second rotation point, or the two third rotation points are pivots.

4. The retractable suspension system of claim 1, wherein the damping component is one of a spring-based damper, an electromagnetic damper, an electric-driven damper, a hydraulic damper, a pneumatic damper, and a combination thereof.

5. The retractable suspension system of claim 1, wherein the A-shaped frame in the first actuating mechanism is further rotatably connected to a suspension rod, with the suspension rod connected to the damping component.

6. The retractable suspension system of claim 1, wherein the integration element is further connected to a tire.

7. The retractable suspension system of claim 6, wherein the integration element comprises:
   a first integration point connected to the first actuating mechanism;
   a second integration point connected to the tire; and
   a third integration point connected to the second actuating mechanism.

8. The retractable suspension system of claim 7, wherein the body is further connected to a drive shaft, whereas the drive shaft is connected to the second integration point.

9. The retractable suspension system of claim 8, wherein the body and the second integration point are connected by two directional ball-and-socket joints at two ends of the drive shaft.

10. The retractable suspension system of claim 7, wherein the first integration point is disposed outside a space of an inner rim for the tire.

11. The retractable suspension system of claim 1, wherein the actuating device is one of a linear motor actuator, a hydraulic actuator, a pneumatic actuator, an electric-driven actuator, and an electromagnetic actuator.

12. A vehicle, comprising the at least a retractable suspension system of claims 1, wherein the body in the at least a retractable suspension system is a vehicle body of the vehicle.

* * * * *